(12) United States Patent
Hayashi et al.

(10) Patent No.: US 8,352,447 B2
(45) Date of Patent: Jan. 8, 2013

(54) METHOD AND APPARATUS TO ALIGN AND DEDUPLICATE OBJECTS

(75) Inventors: Shinichi Hayashi, San Jose, CA (US); Tomohiro Kawaguchi, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/037,649

(22) Filed: Mar. 1, 2011

(65) Prior Publication Data
US 2012/0226672 A1   Sep. 6, 2012

(51) Int. Cl.
*G07F 17/00* (2006.01)
(52) U.S. Cl. .......................... 707/698; 707/692

(58) Field of Classification Search .................... 707/698
See application file for complete search history.

(56) References Cited

U.S. PATENT DOCUMENTS

| 6,928,526 | B1 | 8/2005 | Zhu et al. | |
| 2011/0055471 | A1* | 3/2011 | Thatcher et al. | 711/114 |
| 2012/0084269 | A1* | 4/2012 | Vijayan et al. | 707/692 |

* cited by examiner

*Primary Examiner* — Belix M Ortiz Ditren
(74) *Attorney, Agent, or Firm* — Hitachi America, Ltd

(57) ABSTRACT

In deduplicating data including objects, the system obtains information of the location of the objects and uses the information in calculating the hash value. The hash value calculation program divides data from the boundary location to chunks to match the boundary location of the objects subject to deduplication and the hash value is calculated from each chunk.

16 Claims, 14 Drawing Sheets

203 — OBJECT ALLOCATION INFORMATION

| DATABASE NAME | OBJECT NAME | OBJECT ADDRESS | VIRTUAL VOLUME NAME | VIRTUAL VOLUME ADDRESS | |
|---|---|---|---|---|---|
| DB A | TABLE A | 0 - 25 | V-VOL A | 7 - 32 | 306 |
| DB A | TABLE B | 0 - 9 | V-VOL A | 0-9 | 307 |
| DB A | TABLE B | 10 - 19 | V-VOL A | 100-109 | 308 |
| DB B | TABLE A | 0 - 25 | V-VOL A | 2 - 27 | 309 |

Fig. 3A

320 — READ COMMAND

| COMMAND TYPE | VOLUME NAME | VOLUME ADDRESS |
|---|---|---|
| READ | V-VOL A | 300 - 303 |

Fig. 3B

340 — WRITE COMMAND

| COMMAND TYPE | VOLUME NAME | VOLUME ADDRESS | DATA |
|---|---|---|---|
| WRITE | V-VOL B | 10 - 14 | ABCD |

Fig. 3C

222
RAID GROUP INFORMATION

| RAID GROUP NAME (401) | MEDIA NAME (402) | RAID LEVEL (403) |
|---|---|---|
| RG A | HDD A, HDD B, HDD C, HDD D | RAID 5 | (404)
| RG B | HDD E, HDD F, HDD G, HDD H | RAID 1 | (405)

Fig. 4A

223
LOGICAL VOLUME INFORMATION

| LOGICAL VOLUME NAME (421) | LOGICAL VOLUME ADDRESS (422) | RAID GROUP NAME (423) | RAID GROUP ADDRESS (424) |
|---|---|---|---|
| L-VOL A | 0 - 999 | RG A | 0 - 999 | (425)
| L-VOL B | 0 - 999 | RG A | 1000 - 1999 | (426)
| L-VOL C | 0 - 999 | RG B | 0 - 999 | (427)
| L-VOL D | 0 - 999 | RG B | 1000 - 1999 | (428)

Fig. 4B

224
POOL INFORMATION

| POOL NAME (441) | LOGICAL VOLUME NAME (442) | VIRTUAL VOLUME NAME (443) |
|---|---|---|
| POOL A | L-VOL A, L-VOL B, L-VOL C | V-VOL A, V-VOL B, | (444)
| POOL B | L-VOL D | V-VOL C | (445)

Fig. 4C

| | 225 | | | | | | | |
|---|---|---|---|---|---|---|---|---|
| | VIRTUAL VOLUME INFORMATION | | | | | | | |
| | 501 | 502 | 503 | 504 | 505 | 506 | 507 | 508 |
| | VIRTUAL VOLUME NAME | PAGE NUMBER | OFFSET | LENGTH | LOGICAL VOLUME NAME | PAGE NUMBER | OFFSET | REFERENCE STATUS |
| 509 | V-VOL A | 0 | 0 | 10 | L-VOL A | 6 | 0 | NO |
| 510 | V-VOL A | 1 | 0 | 10 | L-VOL A | 15 | 0 | NO |
| 511 | V-VOL A | 2 | 0 | 10 | L-VOL A | 29 | 0 | NO |
| 512 | V-VOL A | 3 | 0 | 10 | L-VOL A | 33 | 0 | NO |
| 513 | V-VOL B | 0 | 0 | 10 | L-VOL A | 42 | 0 | NO |
| 514 | V-VOL B | 1 | 0 | 10 | L-VOL A | 55 | 0 | NO |
| 515 | V-VOL B | 2 | 0 | 10 | L-VOL A | 67 | 0 | NO |
| 516 | V-VOL B | 3 | - | - | - | - | - | NO |

Fig. 5

VIRTUAL VOLUME INFORMATION 225

| VIRTUAL VOLUME NAME 501 | PAGE NUMBER 502 | OFFSET 503 | LENGTH 504 | LOGICAL VOLUME NAME 505 | PAGE NUMBER 506 | OFFSET 507 | REFERENCE STATUS 508 | |
|---|---|---|---|---|---|---|---|---|
| V-VOL A | 0 | 0 | 10 | L-VOL A | 6 | 0 | NO | 601 |
| V-VOL A | 1 | 0 | 10 | L-VOL A | 15 | 0 | YES | 602 |
| V-VOL A | 2 | 0 | 10 | L-VOL A | 29 | 0 | YES | 603 |
| V-VOL A | 3 | 0 | 10 | L-VOL A | 33 | 0 | NO | 604 |
| V-VOL B | 0 | 0 | 5 | L-VOL A | 42 | 0 | NO | 605 |
| V-VOL B | 0 | 5 | 5 | L-VOL A | 15 | 0 | YES | 606 |
| V-VOL B | 1 | 0 | 5 | L-VOL A | 15 | 5 | YES | 607 |
| V-VOL B | 1 | 5 | 5 | L-VOL A | 29 | 0 | YES | 608 |
| V-VOL B | 2 | 0 | 5 | L-VOL A | 29 | 5 | YES | 609 |
| V-VOL B | 2 | 5 | 5 | L-VOL A | 67 | 5 | NO | 610 |
| V-VOL B | 3 | - | - | - | - | - | - | 611 |

Fig. 6

HASH VALUE INFORMATION

| VIRTUAL VOLUME NAME | OFFSET | LENGTH | HASH VALUE | |
|---|---|---|---|---|
| V-VOL A | 7 | 10 | 642dba5b578e6aee9594a30073cb91f7 | 705 |
| V-VOL A | 17 | 10 | a933a1b0d122ba826d0611695663e3b0 | 706 |
| V-VOL A | 27 | 6 | 0bfa268b7655a4926d92e55cfe5b4ffc | 707 |
| V-VOL B | 2 | 10 | 642dba5b578e6aee9594a30073cb91f7 | 708 |
| V-VOL B | 12 | 10 | a933a1b0d122ba826d0611695663e3b0 | 709 |
| V-VOL B | 22 | 6 | 0bfa268b7655a4926d92e55cfe5b4ffc | 710 |

Fig. 7

METHOD AND APPARATUS TO ALIGN AND DEDUPLICATE OBJECTS

BACKGROUND OF THE INVENTION

The present invention relates generally to information systems involving deduplication and, more particularly, to methods and apparatus for managing deduplication efficiently by using alignment.

In recent years, deduplication has become popular. Deduplication is a data compression technique for deleting duplicated data and leaving only one copy of the data and references to the data. Deduplication can reduce the storage capacity because only one data is stored.

In the deduplication process, data is divided to small chunks. When same chunks are found, then one chunk is left and the other chunks are deleted and references to the one chunk remaining are created for the other chunks. When the size of total data is 1 PB and the size of chunk is 4 KB, the number of chunks is 250,000,000,000. It takes relatively a long time to search the same chunks when the number of chunks subject to compare is relatively large. On the other hand, when the size of chunk is relatively large (for example 1 MB), it takes relatively short time to search the same chunks because the number of chunks subject to compare is relatively small. However, relatively fewer same chunks are found when the size of chunk is relatively large (for example 1 MB) because the boundary location of object and boundary location of chunk has a relatively lower possibility to match. When the size of chunk is relatively small (for example 4 KB), boundary location of object and boundary location of chunk has a relatively higher possibility to match.

BRIEF SUMMARY OF THE INVENTION

Exemplary embodiments of the invention provide system to manage object-based data efficiently by deduplicating data. In deduplicating data, the system obtains information of the location of the objects and uses the information in calculating the hash value.

In some embodiments, the storage system further includes a hash value calculation program which obtains boundary locations of the objects from the object allocation information. The hash value calculation program divides data from the boundary location to chunks to match the boundary location of the objects subject to deduplication. The hash value calculation program calculates hash value from the each chunk. A deduplication program searches the same hash values. When the deduplication program find the same hash values, the deduplication program changes mappings. Several areas on the virtual volumes are mapped to one area on the logical volumes.

These and other features and advantages of the present invention will become apparent to those of ordinary skill in the art in view of the following detailed description of the specific embodiments.

BRIEF DESCRIPTION OF THE DRAWINGS

FIG. 3A illustrates an example of the object allocation information in the memory of FIG. 2A.

FIG. 3B, C illustrates an example of a read command and a write command, which would be issued from the application server to the storage subsystem.

FIG. 4A shows an example of the RAID group information in the memory of FIG. 2B.

FIG. 4B shows an example of the logical volume information in the memory of FIG. 2B.

FIG. 4C shows an example of the pool information in the memory of FIG. 2B.

FIG. 5 shows an example of the virtual volume information in the memory of FIG. 2B before the deduplication.

FIG. 6 shows an example of the virtual volume information in the memory of FIG. 2B after the deduplication.

FIG. 7 shows an example of the hash value information in the memory of FIG. 2B.

DETAILED DESCRIPTION OF THE INVENTION

Figure 1:
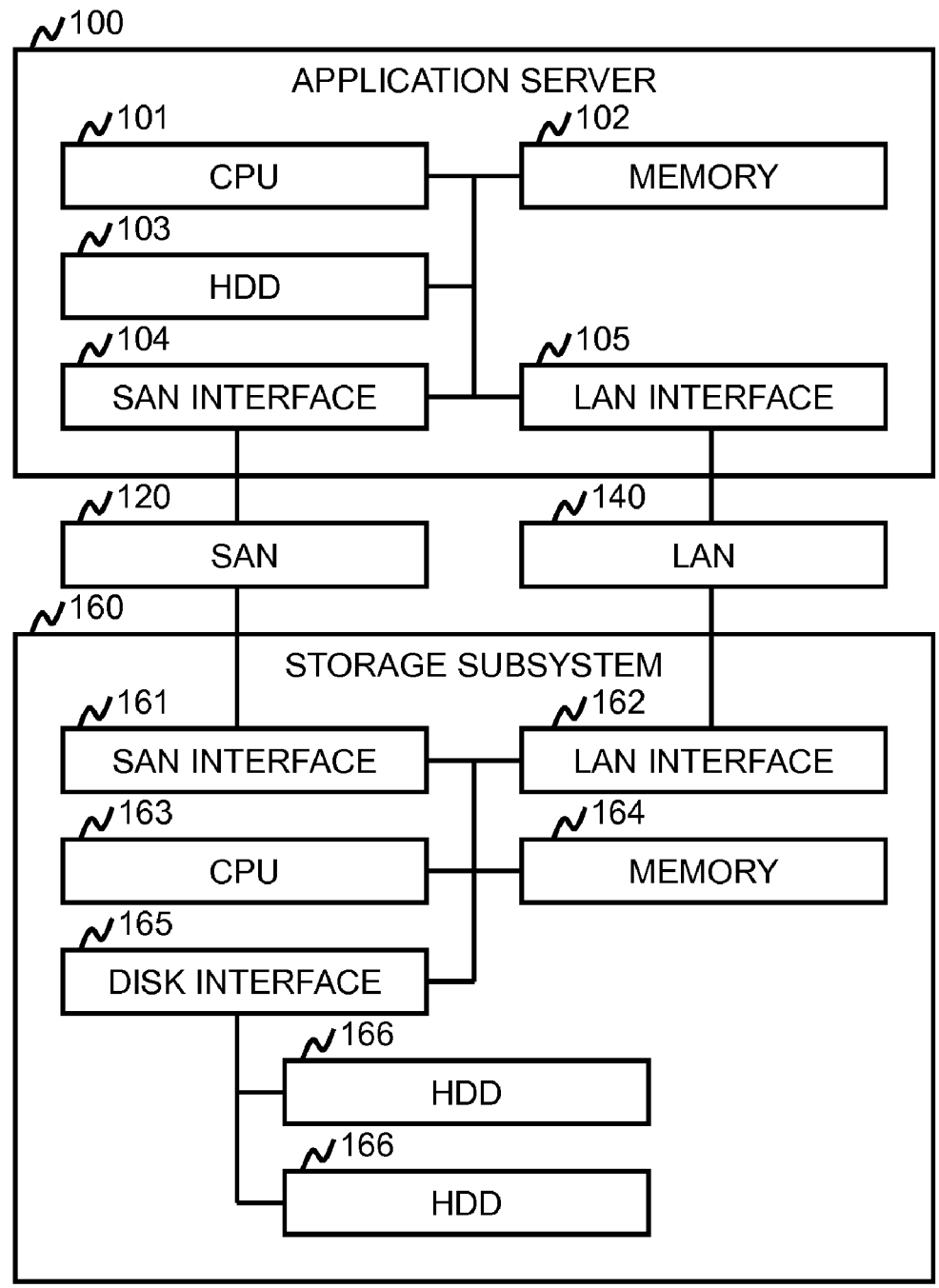
FIG. 1 illustrates an example of a hardware configuration of an information system in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for object-based data management.

System Configuration

FIG. 1 illustrates an example of a hardware configuration of an information system in which the method and apparatus of the invention may be applied. The system comprises an application server 100, a SAN (Storage Area Network) 120, a LAN (Local Area Network) 140, and a storage subsystem 160. The application server 100 comprises a CPU (Central Processing Unit) 101, a memory 102, a HDD (Hard Disk Drive) 103, a SAN interface 104, and a LAN interface 105. The CPU 101 reads programs from the memory 102 and executes the programs. The memory 102 reads programs and data from the HDD 103 when the application server 100 starts and stores the programs and the data. The HDD 103 stores programs and data. The SAN interface 104 connects the application server 100 and the SAN 120. The LAN interface 105 connects the application server 100 and the LAN 140. The SAN 120 connects the application server 100 and the storage subsystem 160. The application server 100 uses the SAN 120 to send application data to the storage subsystem 160 and receive application data from the storage subsystem 160. The application server 100 uses the LAN 140 to send management data to the storage subsystem 160 and receive management data from the storage subsystem 160. The LAN 140 connects the application server 100 and the storage subsystem 160. The storage subsystem 160 comprises a SAN interface 161, a LAN interface 162, a CPU 163, a memory 164, a disk interface 165, and a HDD 166. The SAN interface 161 connects the storage subsystem 160 and the SAN 120. The LAN interface 162 connects the storage subsystem 160 and the LAN 140. The CPU 163 reads programs from the memory 164 and executes the programs. The memory 164 reads programs and data from the HDD 166 when the storage subsystem 160 starts and stores the programs and the data. The disk interface 165 connects the storage subsystem 160, and the HDD 166. The HDD 166 stores programs and data.

Figure 2A:
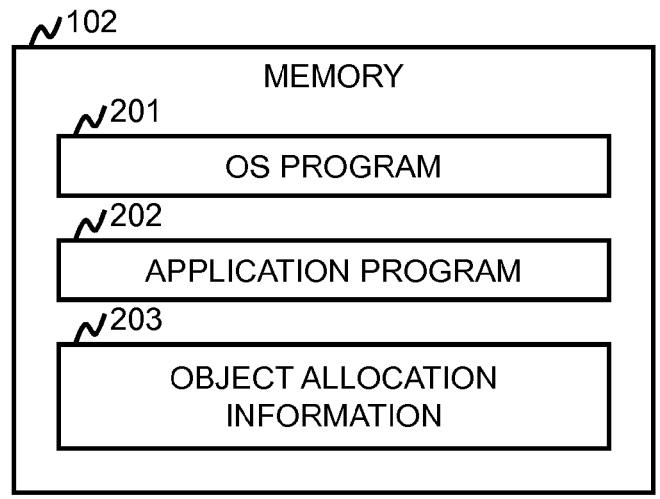
FIG. 2A illustrates an example of the memory in the application server of FIG. 1.
Figure 2B:
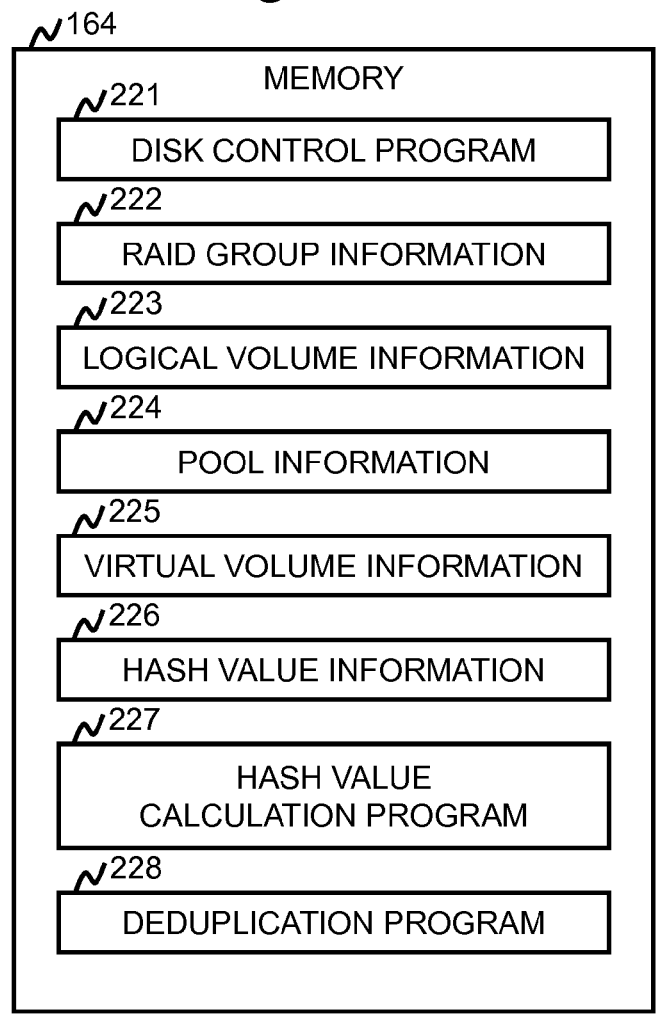
FIG. 2B illustrates an example of the memory in the storage subsystem of FIG. 1.

FIG. 2 illustrates an example of the memory 102 in the application server 100 and the memory 164 in the storage subsystem 160 of FIG. 1. The memory 102 comprises an OS (Operating System) program 201, an application program 202, and object allocation information 203. The OS program 201 executes the application program 202. The application program 202 (e.g., database program) reads data from the storage subsystem 160, processes data, writes the results to the storage subsystem 160, and manages the object allocation information 203.

The memory 164 comprises a disk control program 221, RAID (Redundant Arrays of Inexpensive (or Independent) Disks) group information 222, logical volume information 223, pool information 224, virtual volume information 225, hash value information 226, a hash value calculation program 227, and a deduplication program 228. The disk control program 221 receives a read command and a write command from the application server 100, reads data from the HDD 166, and writes data to the HDD 166 using the RAID group information 222, the logical volume information 223, the pool information 224, and the virtual volume information 225. The hash value calculation program 227 converts a large variable-sized amount of data into a small datum with a hash function. The deduplication program 228 deletes duplicate data and leaves only one copy of the data to be stored along with references to the unique copy of data.

FIG. 3A illustrates an example of the object allocation information 203 in the memory 102. The object allocation information 203 is a table and includes columns of a database name 301, an object name 302, an object address 303, a virtual volume name 304, and a virtual volume address 305. For example, the row 306 shows that the address from "0" to "25" in "TABLE A" in "DB A" is allocated to the address from "7" to "32" in "V-VOL A." The application server 100 has the information of were the objects are stored in the storage system. The storage subsystem would generally not need this information if the system is processing data as blocks and is not aware the content. However, in order to deduplicate the data containing objects, in this invention the storage system maintains the information of the location of the objects stored within its system. This information could be acquired from the application server 100 using the Application Program Interface (API).

FIG. 3B illustrates an example of a read command 320. The read command 320 includes a command type 321, a volume name 322, and a volume address 323. The read command 320 is sent from the application program 202 to the storage subsystem 160.

FIG. 3C illustrates an example of a write command 340. The write command 340 includes a command type 341, a volume name 342, a volume address 343, and data 344. The write command 340 is sent from the application program 202 to the storage subsystem 160.

FIG. 4A shows an example of RAID group information 222 in the memory 164. The RAID group information 222 includes columns of a RAID group name 401, a media name 402, and a RAID level 403. For example, the row 404 shows that "RG A" comprises "HDD A," "HDD B," "HDD C," and "HDD D" and the RAID level of "RG A" is "RAID 5."

FIG. 4B shows an example of the logical volume information 223 in the memory 164. The logical volume information 223 includes columns of a logical volume name 421, a logical volume address 422, a RAID group name 423, and a RAID group address 424. For example, the row 425 shows that "L-VOL A" having address from "0" to "999" is allocated to the address from "0" to "999" in "RG A".

FIG. 4C shows an example of RAID group information 222, the logical volume information 223, and the pool information 224. The pool information 224 includes columns of a pool name 441, a logical volume name 442, and a virtual volume name 443. For example, the row 444 shows "POOL A" comprises "L-VOL A", "L-VOL B," and "L-VOL C," and the area of "POOL A" is used by "V-VOL A" and "V-VOL B." Through the use of pool, the virtual volumes would be allocated to a logical volume when a portion of the virtual volume is actually used. The virtual volume may be divided into pages and when there is a first write command issued against the page, the logical volume is allocated. Thin—provisioning technique would allow to save storage devices required for the system since the storage devices could be allocated later when the virtual volume actually receive data for writing to an address which has not been allocated.

FIG. 5 shows an example of the virtual volume information 225 in the memory 164 before the deduplication is performed. The virtual volume information 225 is a table and includes columns of a virtual volume name 501, a page number 502, an offset 503, a length 504, a logical volume name 505, a page number 506, an offset 507, and reference status 508. The offset 503, 507 indicates the distance from the page beginning when the data is divided for alignment based on the position of the object. The size of page is originally fixed length of 10 in this embodiment. The reference status indicates whether the data is shared against multiple virtual addresses by the deduplication. For example, the row 509 shows that the virtual volume address from "0" to "9" in "V-VOL A" is allocated to the logical volume address from "60" to "69" in "L-VOL A" because the size of page is 10, the address of the page "0" in "V-VOL A" is from "0 (=10×0)" to "9 (=10×0+10−1)," and the address of the page "6" in "L-VOL A" is from "60 (=10×6)" to "69 (=10×6+10−1)." The reference status 508 in all the pages of V-VOL A, B is "NO" since the deduplication program has not been executed and there is no sharing of the data among the virtual volume addresses yet.

FIG. 6 shows an example of the virtual volume information 225 after the deduplication program 228 deduplicated the data containing the same objects. The reference status indicates that the data stored for row 602,603, 606-609 has been shared against at least another virtual volume. The pages in the "V-VOL B" have been divided to align with the pages in "V-VOL A". F or example, the pages "0", "1", "2" in the "V-VOL B" are each separated in two parts, each having data length of 5 bits. The front portion of the page "0" of "V-VOL B" did not match with the page "0" of "V-VOL A", thus the reference status is "NO" (See row 605). The latter portion of the page "0" of "V-VOL B" matched with the page "1" of "V-VOL A" with no offsets, and the data was deduplicated, and the reference status is "YES" (See row 606). The front portion of the page "1" of "V-VOL B" matched with the page "1" of "V-VOL A" with an offset of 5 bits from the beginning of the page, and the data was deduplicated, and the reference status is "YES" (See row 607). The latter portion of the page "1" of "V-VOL B" matched with the page "2" of "V-VOL A" with no offsets, and the data was deduplicated, and the reference status is "YES" (See row 608). The front portion of the page "2" of "V-VOL B" matched with the page "2" of "V-VOL A" with an offset of 5 bits from the beginning of the page, and the data was deduplicated, and the reference status is "YES" (See row 609). The latter portion of the page "2" of "V-VOL B" did not match with the page "3" of "V-VOL A", thus the reference status is "NO" (See row 610).

FIG. 7 shows an example of the hash value information 226 in the memory 164. The hash value information 226 is a table and includes columns of a virtual volume name 701, an offset 702, a length 703, and hash value 704. The offset 702 indicates the offset of the object edge against the page edge. Offset is used to align the boundaries of the objects in hash value calculation. This allows better matching of objects in deduplication. For example, the row 705 shows the hash value of the address from "7" to "16 (=7+10−1)" in the "V-VOL A" is "642dba5b578e6aee9594a30073cb91f7." The hash value calculation program 227 calculates the hash value 704 from the data that the address is specified by the virtual volume name 701, the offset 702, the length 703. Algorithms such as SHA-1, Message-Digest algorithm 5 (MD5) could be used to calculate the hash value.

Figure 8:
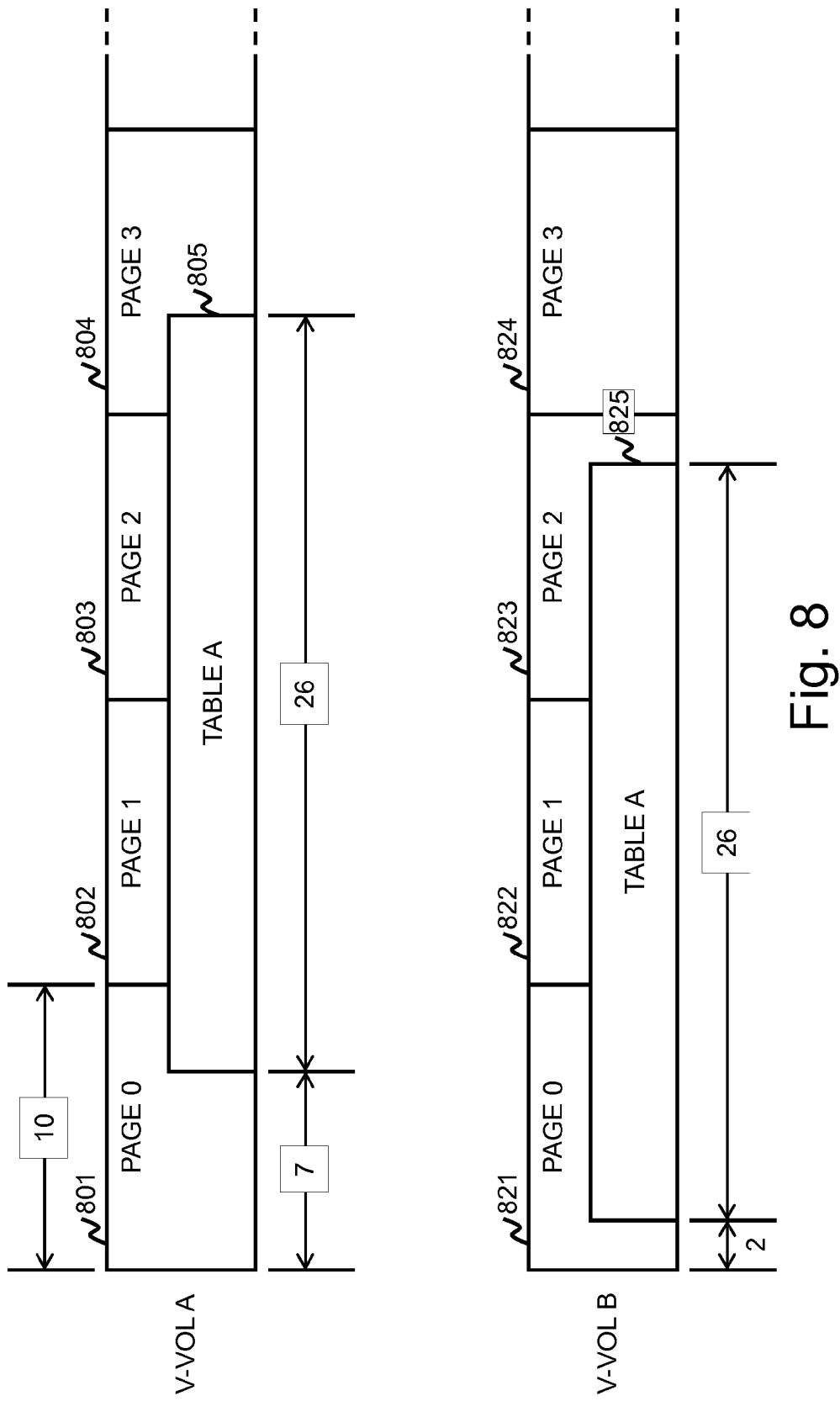
FIG. 8 is an example of a diagram showing how the objects are addressed in the virtual volume.

FIG. 8 shows an example of a diagram illustrating relationships between page and table according to the object allocation information 203. FIG. 8 shows that "V-VOL A" includes PAGE 0 801, PAGE 1 802, PAGE 2 803, PAGE 3 804 and TABLE A is allocated on the address from "7" to "32" on the PAGE 0 801, the PAGE 1 802, the PAGE 2 803, and the PAGE 3 804. There is an offset of 7 between the page boundary and object boundary which could be calculated from the object allocation information 203 (row 306) and is used in calculating the hash value (row 705-707). "V-VOL B" includes PAGE 0 821, PAGE 1 822, PAGE 2 823, PAGE 3 824 and TABLE A is allocated on the address from "2" to "27" on the PAGE 0 821, the PAGE 1 822, the PAGE 2 823, and the PAGE 3 824. There is an offset of 2 between the page boundary and object boundary which could be calculated from the object allocation information 203 (row 309) and is used in calculating the hash value (row 708-710).

Figure 9:
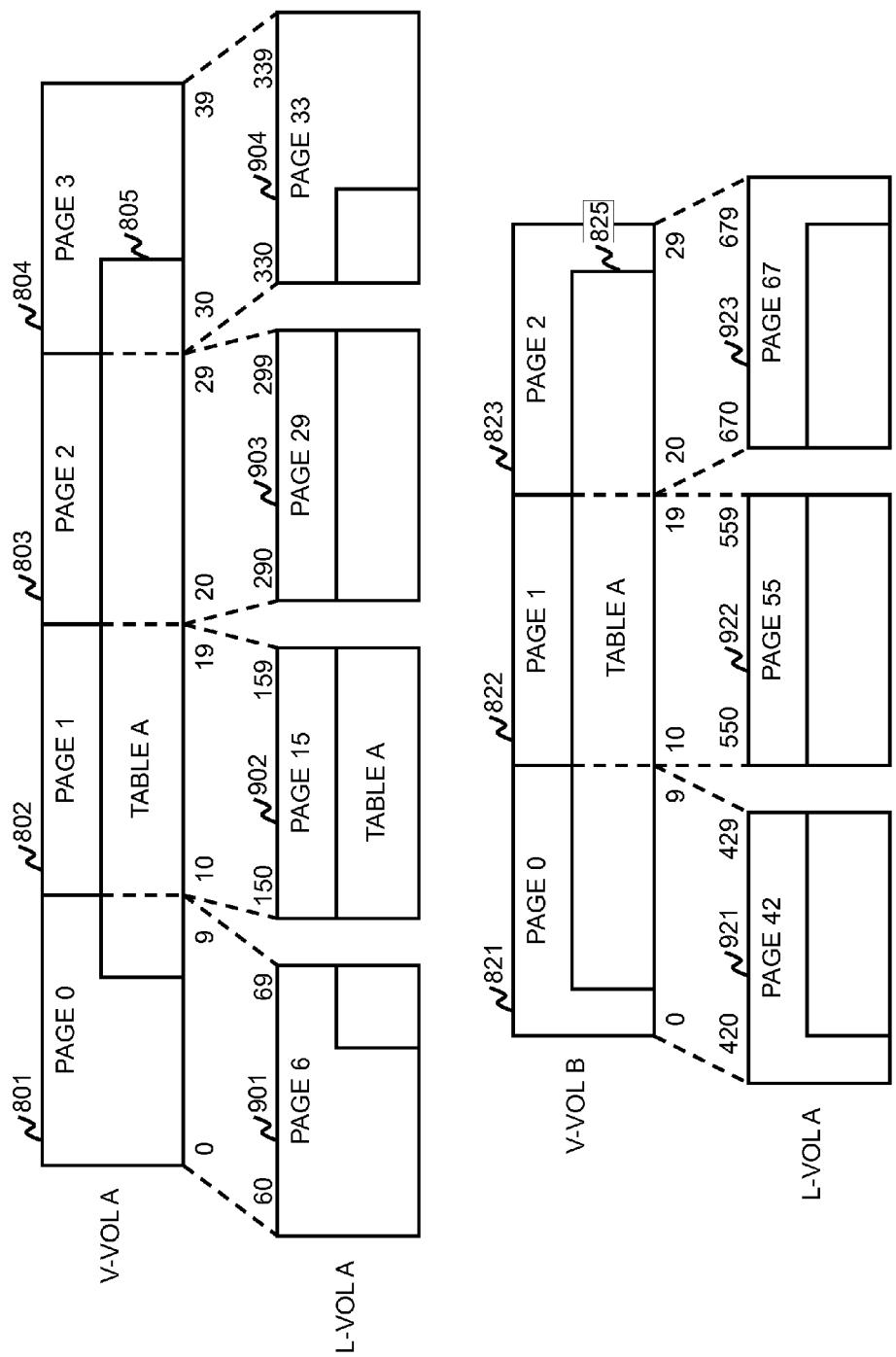
FIG. 9 is an example of a diagram showing the mapping between the virtual volume and the logical volume before the deduplication.

FIG. 9 shows an example of a diagram illustrating relationships between virtual volume and logical volume according to the virtual volume information 225 before the deduplication. FIG. 9 shows that the PAGE 0 801 on the V-VOL A is mapped to PAGE 6 901 on the L-VOL A, the PAGE 1 802 on the V-VOL A is mapped to PAGE 15 902 on the L-VOL A, the PAGE 2 803 on the V-VOL A is mapped to PAGE 29 903 on the L-VOL A, the PAGE 3 804 on the V-VOL A is mapped to PAGE 33 904 on the L-VOL A. The PAGE 0 821 on the V-VOL B is mapped to PAGE 42 921 on the L-VOL A, the PAGE 1 822 on the V-VOL B is mapped to PAGE 55 922 on the L-VOL A, the PAGE 2 803 on the V-VOL B is mapped to PAGE 67 923 on the L-VOL A.

Figure 10:
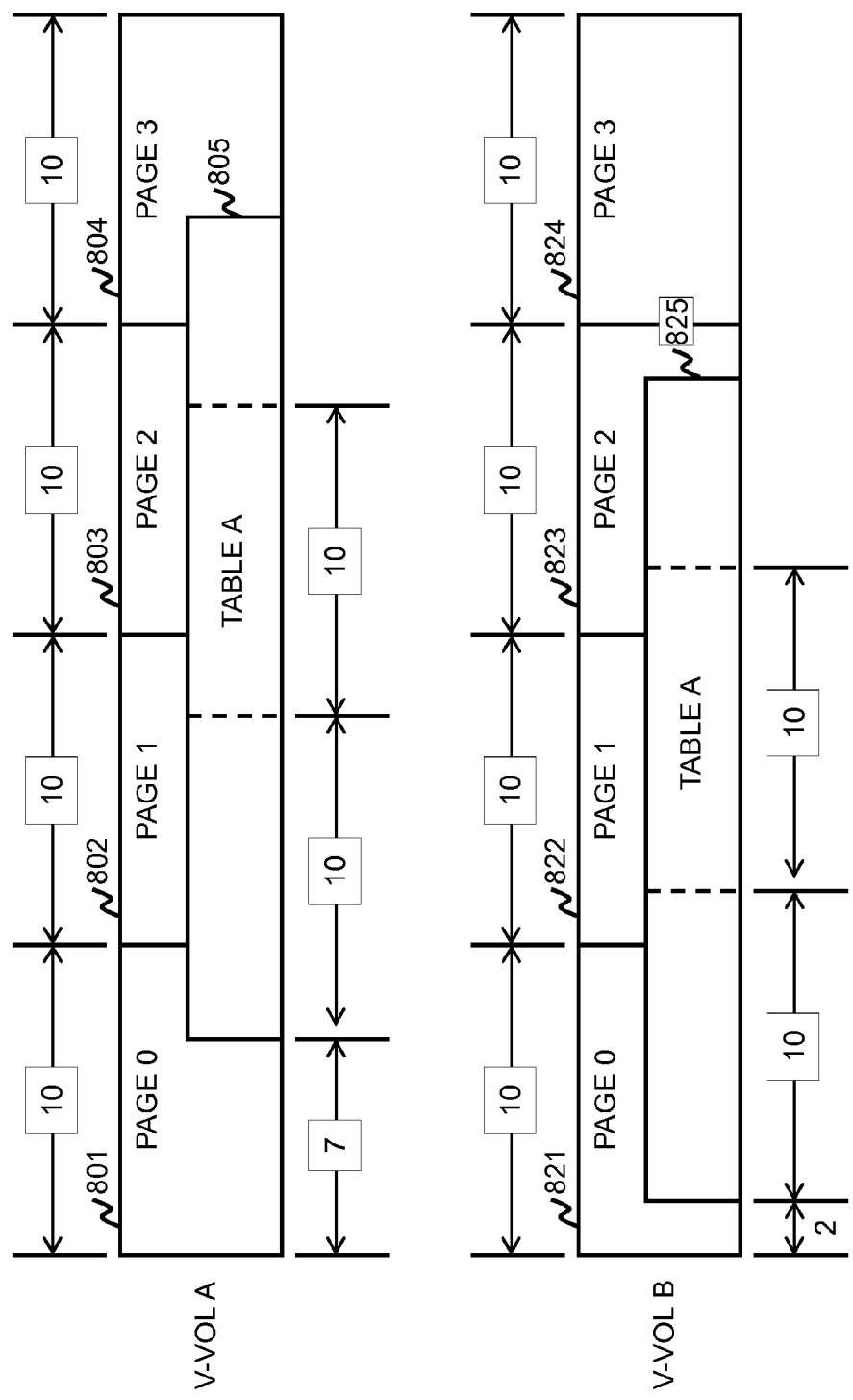
FIG. 10 is an example of a diagram showing how the data is divided to calculate the hash value.

FIG. 10 shows an example of a diagram illustrating how the hash calculation program 227 calculates the hash values. The size of each page, which is the unit for allocating portions of virtual volume against portions of logical volumes, is 10. The hash calculation program 227 separates TABLE A by the size of page (10) from the object boundary based on the information on the object location from the application server 100, calculates a hash value for each divided portion of TABLE A, and writes the calculated hash value to the hash value information 226. Thus, the hash values would be calculated from the edge of the objects. Although, in this embodiment, the hash value is calculated from the front edge, it could be calculated from the back edge, or from any other place as long as the two data subject to deduplication are aligned from the same point. Using the edge boundary would prevent hash calculation of mixed data, non-object and object, which would not likely to match, thus be efficient in terms of calculating only the hash values of the objects.

Figure 11:
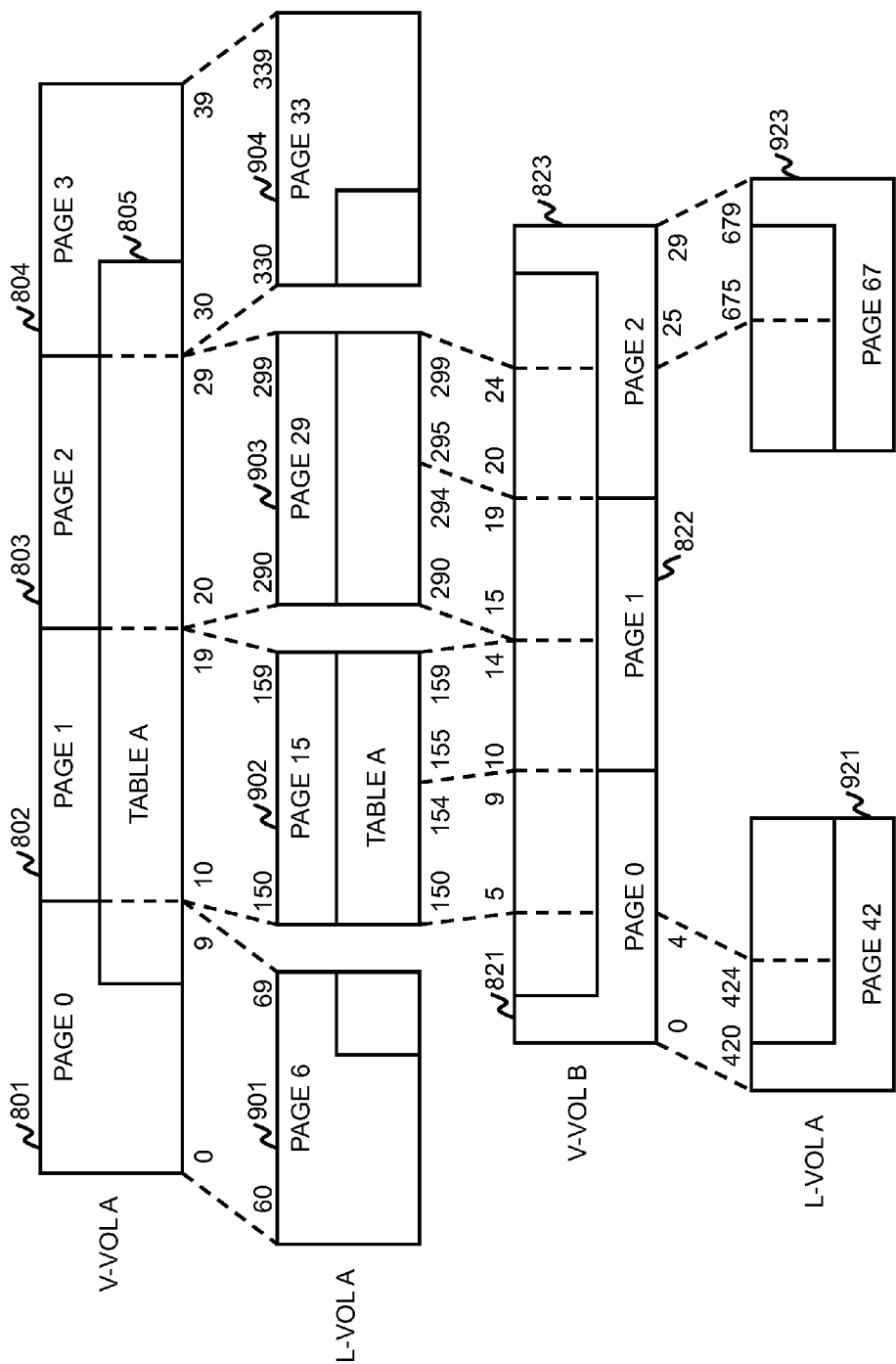
FIG. 11 is an example of a diagram showing the mapping between the virtual volume and the logical volume after the deduplication.

FIG. 11 shows an example of a diagram illustrating relationships between virtual volume and logical volume after the deduplication program 228 deduplicated duplicated pages. The PAGE 1 822 is mapped to the PAGE 55 922 in FIG. 9 before the deduplication program 228 deduplicate duplicated pages. The page 1 822 is separated into two parts, the address from "10" to "14" in the PAGE 1 822 is mapped to the address from "155" to "159" in the PAGE 15 902 and the address from "15" to "19" in the PAGE 1 822 is mapped to the address from "290" to "294" in the PAGE 29 903, thus the original PAGE 55 922 could be released and be allocated against a new page of the virtual volume.

Figure 12:
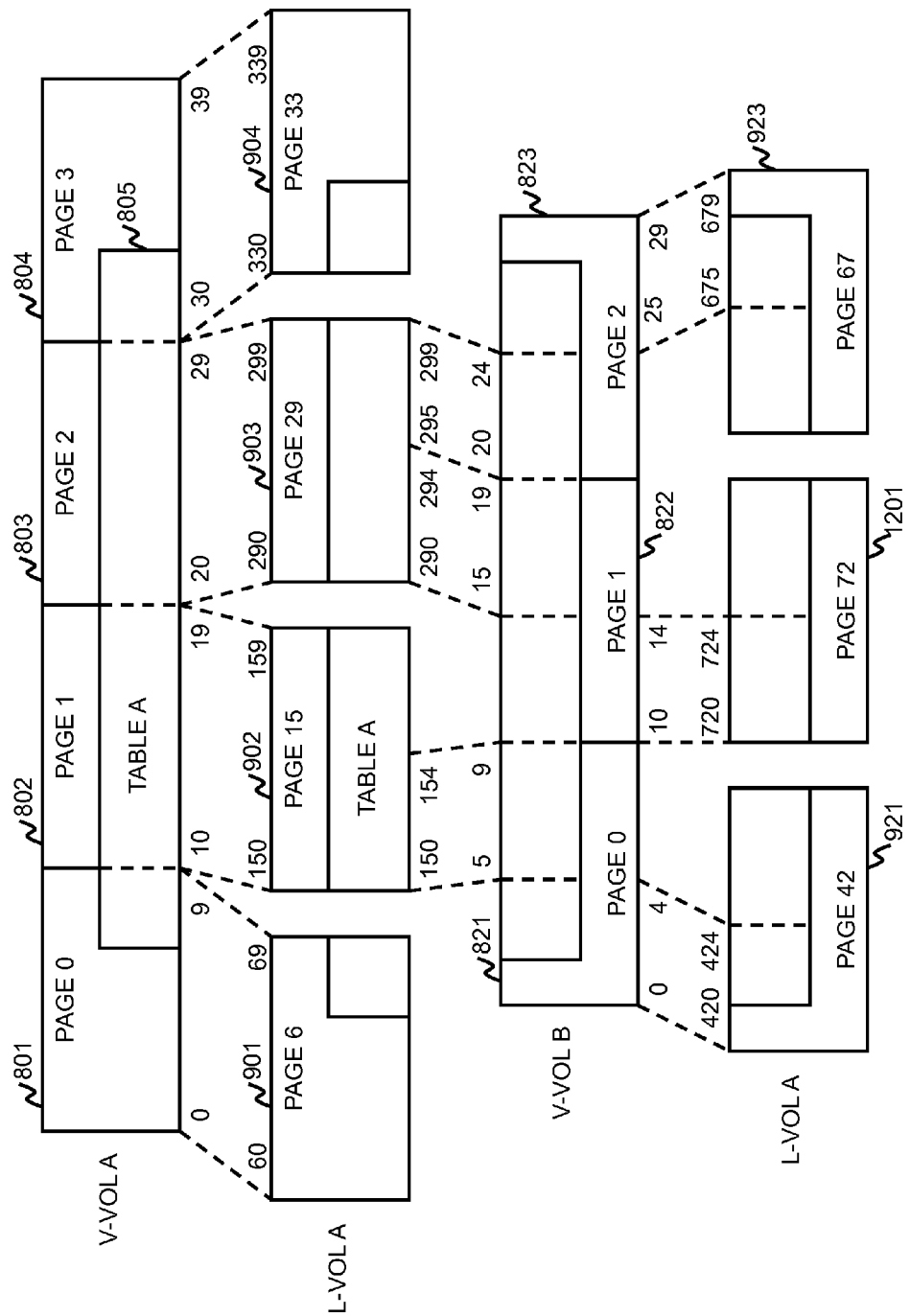
FIG. 12 is an example of a diagram showing the mapping between the virtual volume and the logical volume after a write command is processed against a region that was deduplicated.

FIG. 12 shows an example of a diagram illustrating relationships between virtual volume and logical volume after the storage subsystem 160 received a write command to write data to virtual volume address 10-14 on page 1 822 on the V-VOL B, which was deduplicated. The address from "10" to "14" in the PAGE 1 822 was mapped to the address from "155" to "159" in the PAGE 15 902 in FIG. 11, after the deduplication, but the address from "10" to "19" in the PAGE 1 822 needs to be mapped to a new page, address from "720" to "724" in a PAGE 72 1201 in FIG. 12 because it no longer shares the same data. The deduplication program 228 changes the virtual volume information 225 according to the change of mapping.

Process Flow Diagrams

Figure 13:
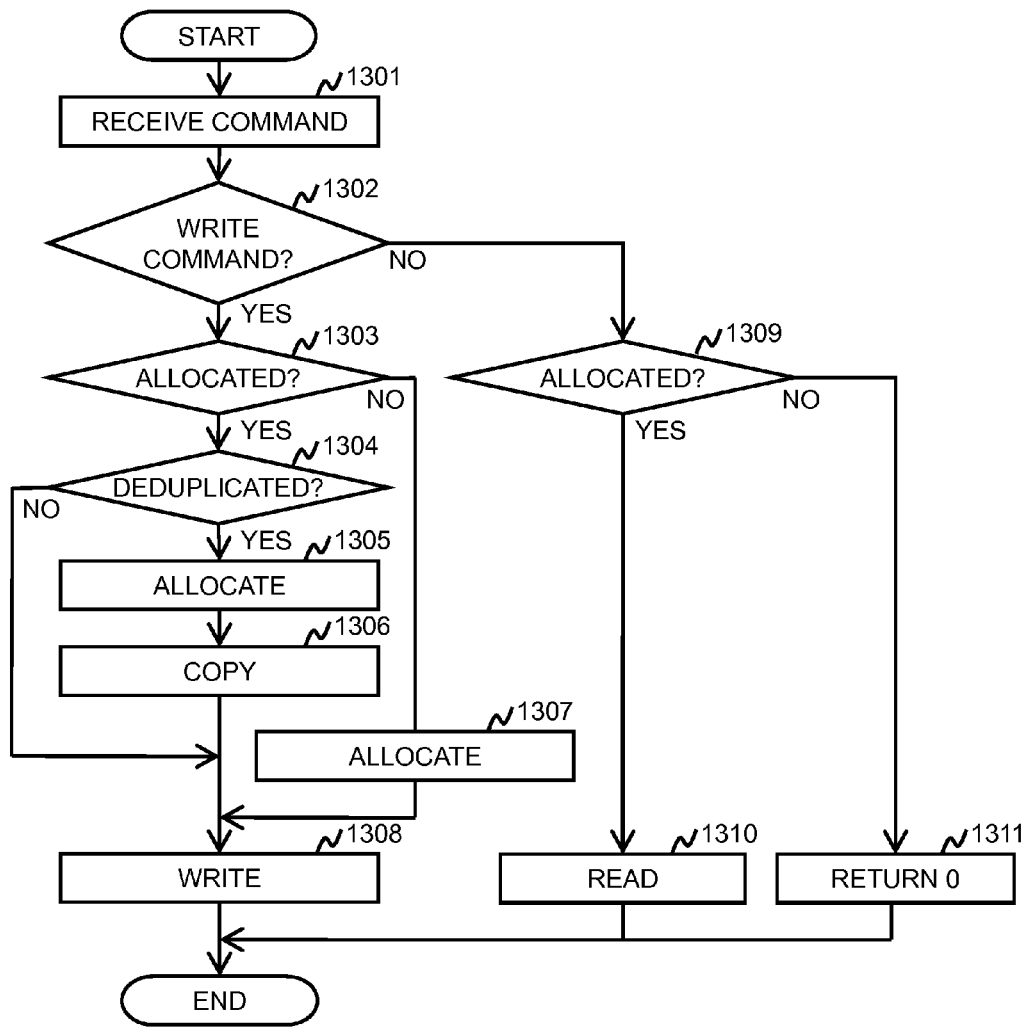
FIG. 13 is an example of a flow diagram on how the Input/Output (I/O) commands are processed for the storage subsystem.

FIG. 13 is an example of a flow diagram showing the operation of the disk control program 221. The disk control program 221 reads data from the storage subsystem 160, and writes data to the storage subsystem 160 in response to receiving a read command 320 or a write command 340 from the application program 202.

In step 1301, the disk control program 221 is executed when the storage subsystem receives a read command 320 or a write command 340 from the application program 202. In step 1302, if the command that the disk control program 221 received in step 1301 is a write command 340, then the process goes to step 1303; if not, then the process goes to step 1309.

In step 1303, if the volume name 342 and the volume address 343 are allocated in the virtual volume information 225, then the process goes to step 1304; if not, then the process goes to step 1307. In step 1304, if the reference status 508 specified by the volume name 342 and the volume address 343 is "NO", then the process goes to step 1308; if not, then the process goes to step 1305. In step 1305, the disk control program 221 allocates an another area of a logical volume to the virtual volume specified by the volume name 342 and the volume address 343 and updates virtual volume information 225. For example, when the volume name 342 is "VOL-B" and the volume address 343 is "10-14" for a write command 340, the disk control program 221 writes the data 344 to the page 1 822 on the V-VOL B in FIG. 11. The target address specified by the volume name 342 and the volume address 343 has been mapped to the address from "155" to "159" on the L-VOL A by the deduplication program 228. By referring to the reference status 508 in the row 607 in the virtual volume information 225, the disk control 221 allocates the area of the virtual volume subject to the write command to an another area of a logical volume instead of the address from "10" to "14" on the V-VOL A. In this case, the disk control group allocates the page 72 1201 and updates the virtual volume information 225 so that the address from "10" to "14" on the V-VOL A is mapped to the address from "720" to "724" on the L-VOL A in FIG. 12. In step 1306, the deduplication program 228 copies data specified by the address from "10" to "14" on the V-VOL A to the address from "720" to "724" on the L-VOL A. Copying is performed because the writing against data areas in the logical volume would be conducted in units of a page. In step 1307, the disk control program 221 allocates an unallocated area of a logical volume to the virtual volume specified by the volume name 342 and the volume address 343 and updates virtual volume information 225. In step 1308, the disk control program 221 gets the volume name 342 and the volume address 343 from the write command 340, gets the logical volume name 505, the page number 506, and the offset 507 from the virtual volume information 225, gets the RAID group name 423 and the RAID group address 424 from the logical volume information 223, gets the media name 402 from the RAID group information 222, and writes the data 344 to the HDD 166 based on the mapping information gathered.

In step 1309, if the volume name 322 and the volume address 323 are allocated in the virtual volume information 225, then the process goes to step 1310; if not, then the process goes to step 1311. In step 1310, the disk control program 221 gets the volume name 322 and the volume address 323 from the read command 340, gets the logical volume name 501, the page number 502, the offset 503, and the length 504 from the virtual volume information 225, gets the RAID group name 421 and the RAID group address 422 from the logical volume information 223, gets the media name 402 from the RAID group information 222, and reads data from the HDD 166 based on the mapping information gathered. In step 1311, the disk control program 221 returns "0" to the application server 100 because the area specified by the volume name 322 and the volume address 323 of the read command 320 is not one to which data is written.

Figure 14:
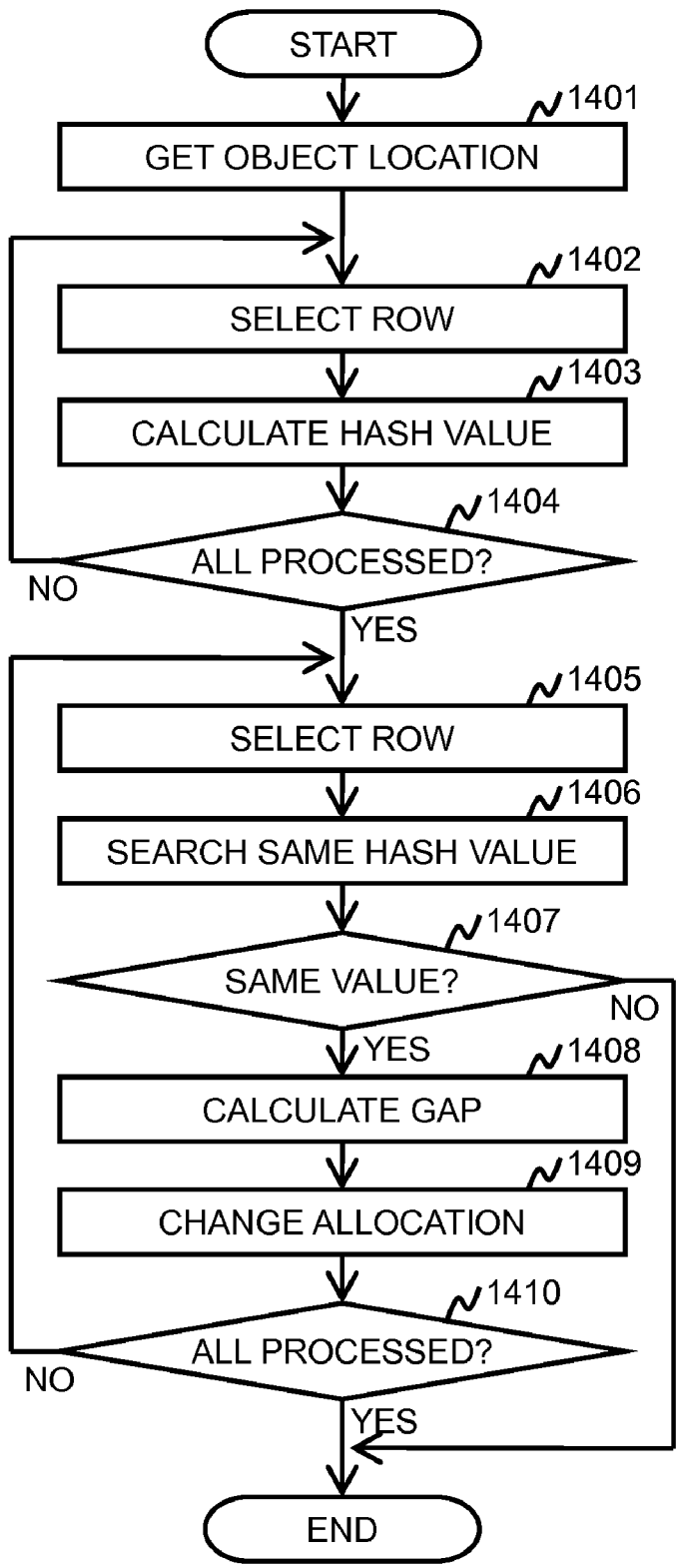
FIG. 14 is an example of a flow diagram of the deduplication process.

FIG. 14 is an example of a flow diagram showing the flow of the deduplication program 228, which searches duplicated data and deduplicates the duplicated data. This deduplication program 228 can be executed by the processor 163 periodically, when the processor 163 determines that the load of processor is relatively low, or when the processor 163 determines that the number objects written to said storage subsystem 160 exceeds a predetermined number. The processor 163 could make this determination by retrieving object information from the application server.

In step 1401, the hash value calculation program 227 obtains the object allocation information 203 from the application server 100. Alternatively, this information could be sent from the application server periodically, or after the information is updated.

In step 1402, the hash value calculation program 227 selects an object (row) from the object allocation information 203. For example, the hash value calculation program 227 selects the "TABLE A" of "DB A" (row 306). In step 1403, the hash value calculation program 227 divides the data specified by the virtual volume name 304 and the virtual volume address 305 that is selected in step 1402 to the size of page. For example, the address from "7" to "32" is divided to the address from "7" to "16", from "17" to "26", and "27" to "32" as in FIG. 10. The hash value calculation program 227 calculates hash values for each divided data. The hash value calculation program 227 then stores the hash values to the hash value information 226. For example, the hash value 704 of the data specified by the address from "7" to "32" is stored in the row 705. In step decision 1404, if the hash value calculation program 227 calculates hash values for all the objects (rows) in the object allocation information 203, then the process goes to step 1405; if not, then the process goes to step 1402 to calculate hash function for the remaining objects, which the hash value has not been calculated.

In step 1405, after all the hash value for the objects have been calculated, the deduplication program 228 selects one of calculated hash value (row) from the hash value information 226. For example, the deduplication program 228 selects the row 705. In step 1406, the deduplication program 228 compares with the other calculated hash values 704, and searches for the hash value 704 that matches the hash value 704 that is selected in step 1405. In this case, the hash value 704 in the row 705 has the same value as the hash value 704 in the row 708. In step decision 1407, if the deduplication program 228 found the same value as the hash value 704 that is selected in step 1405, then the process goes to step 1408; if not, then the process goes to step 1411.

In step 1408, the deduplication program 228 calculates the difference between the offsets 702 that have the same hash values. This gap would be required to update the allocation after the data is deduplicated. In this case, the offset 702 in the row 705 is "7" and the offset 702 in the row 708 is "2." Therefore the gap between the objects is "5" (7−2=5).

In step 1409, the deduplication program 228 divides the page that is found in step 1406 to two areas and changes allocation to map objects that hash value is the same to one page on logical volume and updates the virtual volume information 225. The gap calculated in step 1408 would be used to divide the page. In this case, the deduplication program 228 divides the page 0 821 on the V-VOL B to the address from "0" to "4" and the address from "5" to "9" based on the gap calculated. The deduplication program 228 does not change allocation of the address from "0" to "4" in the page 0 821 on the V-VOL B because there are 2 objects in the address from "0" to "4." The deduplication program 228 changes allocation of the address from "5" to "9" in the page 0 821 on the V-VOL B to the address from "150" to "154" in the page 15 902 on the L-VOL A. The deduplication program 228 updates the virtual volume information 225 to record the mapping information and reference status. In this case, before step 1409, the address from "0" to "9" of the page 0 821 on the V-VOL B was mapped to the address from "420" to "429" of the page 42 921 on the L-VOL A as shown in FIG. 5 and FIG. 9. However, after step 1409, the address from "0" to "4" in the page 0 821 on the V-VOL B is still mapped to the address from "420" to "424" in the page 42 921 on the L-VOL A, but the address from "5" to "9" in the page 0 821 on the V-VOL B was mapped to the address from "150" to "154" in the page 15 902 on the L-VOL A as shown in FIG. 6 and FIG. 11. The deduplication program 228 also changes the reference status 508 from "NO" to "YES". If the hash value 704 next to the hash value that is selected in step 1405 is the same, then the deduplication program 228 changes allocations as well. For example, the hash value 704 in the row 706 and the hash value 704 in the row 709 is the same, then the address from "10" to "14" of the page 1 822 on the V-VOL B is mapped to the address from "155" to "159" of the page 15 902 on the L-VOL A In step decision 1410, the deduplication program 228 checks if all the rows in the hash value information 226 have been subject to hash value comparison and all the data having the same hash values have been identified. If so, then the process ends; and if not, then the process goes to step 1405 so that another hash value is subject to comparison.

Of course, the system configurations illustrated in FIG. 1 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for object-based tier management. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. An storage system coupled to a server for managing object-based data comprising:
    a processor;
    a memory; and
    a plurality of storage devices,
    wherein in deduplicating data, said storage system obtains information of boundary location of objects included in the data subject to deduplication, divides the data subject to deduplication based on said information of boundary location of the objects, and calculates hash value of said divided data,
    wherein said storage system provides a plurality of virtual volumes to said server, and each page of said plurality of virtual volumes are allocated from a plurality of logical volumes allocated from said plurality of storage devices, said allocation of each said page from said plurality of logical volumes is performed when the page is subject to a write command,
    wherein said memory maintains said information of the boundary location of objects and allocation between the pages of said plurality of virtual volumes and said plurality of logical volumes,
    wherein said server includes an application program which reads data from said plurality of virtual volumes, processes said data, and writes the data to said plurality of virtual volumes,
    wherein said information of boundary location of objects are managed by said application program, said information of boundary location of objects including an address of said virtual volume, and
    wherein said information of boundary location of objects are obtained from said server.

2. The storage system according to claim 1,
    wherein if the calculated hash value of said divided data of two objects matches, a portion of said logical volume storing one of said divided data is released and corresponding page of said virtual volume is associated with a portion of said logical volume storing the other one of said divided data.

3. The storage system according to claim 2,
    wherein in response to a write command from said server, if an address of said virtual volume subject to said write command has been deduplicated, said storage system allocates a new region from said plurality of logical volumes.

4. The storage system according to claim 3,
    wherein if an address of said virtual volume subject to said write command has been deduplicated, said storage system releases the association between said page of said virtual volume and said portion of said logical volume storing the other one of said divided data.

5. The storage system according to claim 3,
    wherein said memory includes a status information of whether each page of said plurality of virtual volumes has been deduplicated or not, and if said new region is allocated against said write command, said status information on the corresponding page is set as not deduplicated.

6. The storage system according to claim 3,
    said memory includes information of offset between the object and page and the length of divided data subject to hash value calculation.

7. The storage system according to claim 1,
    wherein said deduplication is performed by executing a deduplication program stored in said memory, and said deduplication is performed when said storage system subject to commands issued from said server.

8. The storage system according to claim 1,
    wherein said plurality of storage devices are hard disk drives.

9. A method for managing object-based data in a system which includes a server and a storage system, the storage system having a plurality of storage devices, the method comprising:
    obtaining information of boundary location of objects included in the data subject to deduplication;
    dividing the data subject to deduplication based on said information of boundary location of the objects;
    calculating hash values of said divided data; and
    comparing said hash values calculated,
    wherein said storage system provides a plurality of virtual volumes to said server, and each page of said plurality of virtual volumes are allocated from a plurality of logical volumes allocated from said plurality of storage devices, said allocation of each said page from said plurality of logical volumes is performed when the page is subject to a write command,
    wherein said information of the boundary location of objects and allocation between the pages of said plurality of virtual volumes and said plurality of logical volumes are maintained by said storage system,
    wherein said server includes an application program which reads data from said plurality of virtual volumes, processes said data, and writes the data to said plurality of virtual volumes,
    wherein said information of boundary location of objects are managed by said application program, said information of boundary location of objects including an address of said virtual volume, and
    wherein said information of boundary location of objects are obtained from said server.

10. The method according to claim 9,
    if the calculated hash value of said divided data of two objects matches, releasing a portion of said logical volume storing one of said divided data, and associating corresponding page of said virtual volume with a portion of said logical volume storing the other one of said divided data.

11. The method according to claim 10,
    in response to a write command from said server, if an address of said virtual volume subject to said write command has been deduplicated, allocating a new region from said plurality of logical volumes.

12. The method according to claim 11,
    if an address of said virtual volume subject to said write command has been deduplicated, releasing the association between said page of said virtual volume and said portion of said logical volume storing the other one of said divided data.

13. The method according to claim 11,
maintaining a status information of whether each page of said plurality of virtual volumes has been deduplicated or not; and
if said new region is allocated against said write command, setting said status information on the corresponding page as not deduplicated.

14. The method according to claim 11,
storing in said storage system information of offset between the object and page and the length of divided data subject to hash value calculation.

15. The method according to claim 9,
wherein said deduplication is performed by executing a deduplication program stored in said memory, and said deduplication is performed when said storage system subject to commands issued from said server.

16. The method according to claim 9,
wherein said plurality of storage devices are hard disk drives.

* * * * *